US012639985B2

(12) United States Patent
Reinbold et al.

(10) Patent No.: US 12,639,985 B2
(45) Date of Patent: May 26, 2026

(54) TIME AND/OR ATTENDANCE RECORDING DEVICE; SYSTEM; METHOD FOR OPERATING A TIME AND/OR ATTENDANCE RECORDING DEVICE; COMPUTER PROGRAM PRODUCT

(71) Applicant: dormakaba EAD GmbH, Villingen-Schwenningen (DE)

(72) Inventors: Andreas Reinbold, Villingen-Schwenningen (DE); Martin Ruof, Villingen-Schwenningen (DE); Elmar Meiss, Villingen-Schwenningen (DE); Hartmut Koeppinger, Villingen-Schwenningen (DE); Heinz Schwab, Villingen-Schwenningen (DE)

(73) Assignee: DORMAKABA EAD GMBH, Villingen-Schwenningen (DE)

( * ) Notice: Subject to any disclaimer, the term of this patent is extended or adjusted under 35 U.S.C. 154(b) by 433 days.

(21) Appl. No.: 18/103,953

(22) Filed: Jan. 31, 2023

(65) Prior Publication Data

US 2023/0252823 A1     Aug. 10, 2023

(30) Foreign Application Priority Data

Feb. 9, 2022     (EP) ..................................... 22155945

(51) Int. Cl.
| | |
|---|---|
| *G07C 1/12* | (2006.01) |
| *G06Q 10/1091* | (2023.01) |
| *G07C 1/10* | (2006.01) |

(52) U.S. Cl.
CPC ........... *G07C 1/12* (2013.01); *G06Q 10/1091* (2013.01); *G07C 1/10* (2013.01)

(58) Field of Classification Search
CPC ........ G07C 1/12; G07C 1/10; G06Q 10/1091; G06F 21/6245
See application file for complete search history.

(56) References Cited

U.S. PATENT DOCUMENTS

| | | | |
|---|---|---|---|
| 2012/0079579 A1* | 3/2012 | Kamakura | .......... H04L 63/0861 726/7 |
| 2021/0326811 A1 | 10/2021 | Chen et al. | |
| 2022/0076506 A1* | 3/2022 | de Matos | ........... G06Q 10/1091 |

FOREIGN PATENT DOCUMENTS

| | | |
|---|---|---|
| JP | 2001184308 A | 7/2001 |

OTHER PUBLICATIONS

Apple Community, Make all Apple Music songs available offline listening just one clock, 2015, https://discussions.apple.com/thread/7122006?sortBy=rank&page=3 (Year: 2015).*

(Continued)

*Primary Examiner* — Aaron Tutor
(74) *Attorney, Agent, or Firm* — CANTOR COLBURN LLP

(57) ABSTRACT

A time and/or attendance recording device for time and/or attendance recording of people,
 has a local memory or is connected to a local memory, and further includes a communication interface for communicating with a server system.
Personal data may be stored in the local memory,
 wherein the time and/or attendance recording device is configured such that personal data is stored in the local memory depending on which group of people from a number of groups of people a person is assigned.

14 Claims, 5 Drawing Sheets

Assigning a person to a group of people from a plurality of groups of people. — S41

Storing personal data in the local memory depending on to which group of people from the plurality of groups of people the person is assigned. — S42

(56)             References Cited

OTHER PUBLICATIONS

Apple Community, Smart Playlist for songs played most often within time period??, 2009, https://discussions.apple.com/thread/2026042?sortBy=rank (Year: 2009).*

Apple Community, Is there a limit on how many songs I can download?, 2017, https://discussions.apple.com/thread/8039572?answerId=32096388022&sortBy=rank#32096388022 (Year: 2017).*

Bruno Zoric, Design and Development of a Smart Attendance Management System with Bluetooth Low Energy Beacons, May 30, 2019, Zooming Innovation in Consumer Technologies Conference, pp. 86-91 (Year: 2019).*

* cited by examiner

| Assigning a person to a group of people from a plurality of groups of people. | S41 |

| Storing personal data in the local memory depending on to which group of people from the plurality of groups of people the person is assigned. | S42 |

TIME AND/OR ATTENDANCE RECORDING DEVICE; SYSTEM; METHOD FOR OPERATING A TIME AND/OR ATTENDANCE RECORDING DEVICE; COMPUTER PROGRAM PRODUCT

CROSS-REFERENCE TO RELATED APPLICATIONS

The present application claims priority to European patent application no. 22155945.3, filed on 9 Feb. 2022, the contents of which are herein incorporated by reference in their entirety.

TECHNICAL FIELD

The present disclosure relates to a time and/or attendance recording device for time and/or attendance recording of people. The disclosure also relates to a system, having such a time and/or attendance recording device, as well as to a method for operating such a time and/or attendance recording device, and to a computer program product.

BACKGROUND

Time and/or attendance recording devices are generally known and serve for example to record and maintain the working hours of people employed in a 20 company. Such devices can also be used for other people, for example external service providers. Such time and/or attendance recording devices are frequently fitted in the entrance area of buildings such that the employees arrive at the devices at the beginning of their working hours and at the end of their working hours.

Increasingly greater requirements are being placed on the handling and maintenance of personal data in order to ensure data privacy. At the same time, increasingly more people work remotely at different locations.

SUMMARY

Therefore, there is a need for systems, which enable time and attendance to be recorded reliably and which operate efficiently at the same time in order to avoid unnecessary wait times for the users at a time recording terminal, in particular at peak times or typical times for shift changes, for example mornings or evenings.

Against this background, the disclosure provides an advantageous time and/or attendance recording device, by means of which preferably short wait times can be achieved and/or a resource-saving and/or energy-saving use is possible. The disclosure also provides a corresponding system and a method for operating a time and/or attendance recording device.

The disclosure provides a time and/or attendance recording device for time and/or attendance recording of people, characterized in that the time and/or attendance recording device has a local memory or is connected to a local memory, wherein the time and/or attendance recording device has a communication interface for communicating with a server system, wherein personal data can be stored in the local memory, wherein the time and/or attendance recording device is configured in such manner that personal data is stored in the local memory depending on to which group of people from a plurality of groups of people a person is assigned.

According to the disclosure, an advantageous efficiency can be hereby achieved for the time and/or attendance recording of people, for example employees of a company. Since personal data is stored in the local memory depending on to which group of people from a plurality of groups of people a person is assigned, the data transmission between the time and/or attendance recording device, for example a terminal, and the server system can be reduced. This results in shorter wait times and a shorter latency for user interactions with the time and/or attendance recording device since relevant data can be made available more quickly. In particular, wait times, which can result from communication of a time and/or attendance recording device with a server during clocking actions of individual people at the time and/or attendance recording device, can be reduced. Advantageously, the local storage of personal data in the local memory can be used to avoid communication with a remote server having to be carried out for each clocking process in the case of clocking actions of people whose personal data is stored in the local memory, which would lead to significant wait times or an overloading of the communication systems or of the server in particular at peak times, during which many people carry out, at the same time or in quick succession, interactions with the time and/or attendance recording devices of a building and/or area.

According to the disclosure, the storage behavior for the personal data of people can be influenced by assigning people to determined groups of people. According to the disclosure, a dynamic storage management and/or a dynamic management of personal data can be carried out across various locations of a company.

According to the disclosure, it is hereby for example possible to store personal data locally in the local memory for people who regularly enter the same building and/or area, such that a central server system does not have to be involved for these people during each clocking process.

The time and/or attendance recording device according to the disclosure has in particular computer means, by means of which the configuration of the time and/or attendance recording device is implemented.

The time recording device and/or attendance recording device according to the disclosure can be designed in particular as a working time recording device for recording working times of people.

The time and/or attendance recording device according to the disclosure can preferably be attached, placed and/or assembled in or on a building and/or area. A location of a company can in particular also be understood as a building and/or area according to the present disclosure.

The local memory is preferably a non-volatile memory. It is conceivable that the local memory is formed by one or a plurality of memory units.

According to the present disclosure, it is conceivable that the groups of people can also be understood in particular as categories, to which a person can be assigned. Accordingly, the plurality of groups of people can be understood as a plurality of categories, to which a person can be assigned. The different groups of people of the plurality of groups of people differ in particular in how and/or where personal data of people of these groups of people is stored. It is conceivable that the personal data of all persons, who are each assigned to the same group of people, are treated equally. The plurality of groups of people can for example comprise two groups of people, three groups of people or more than three groups of people.

Personal data can be understood according to an embodiment of the present disclosure, in particular as data, which is personal in such manner that it can be unambiguously assigned to a determined natural person or this assignment can take place at least indirectly. The personal data can therefore, according to the disclosure, also comprise data that is relatable to a person. It is conceivable that personal data according to an embodiment of the present disclosure comprises personal master data.

According to the disclosure, it is preferably conceivable that personal data is stored encrypted, for example password-encrypted, in the local memory and/or that personal data can be retrieved by means of the time and/or attendance recording device, or can be displayed or presented by the time and/or attendance recording device only by using an encryption, for example a password encryption. Other or additional keys or encryption functions are also conceivable. Advantageous data protection can be hereby achieved.

According to an embodiment of the present disclosure, it is conceivable that a person can input and/or change personal data via an input device of the time and/or attendance recording device. It is conceivable that personal data can be displayed to a person via a playback device of the time and/or attendance recording device, for example via a screen. Therefore, it is conceivable that the person can access their personal data via the time and/or attendance recording device and can input or request holidays for example, or view or change their personal master data. It is also conceivable that via the time and/or attendance recording device a person can communicate with a human resources department of the company to which the time and/or attendance recording device is assigned. For example, it is conceivable that messages from the human resources department of the company to the person are displayed on the playback device of the time and/or attendance recording device and/or that the person can generate messages to the human resources department of the company by means of the input device of the time and/or attendance recording device.

Advantageous further developments and configurations of the present disclosure can be inferred from the dependent claims.

According to one embodiment of the present disclosure, it is provided that the plurality of groups of people comprises at least one first group of people, wherein personal data relating to people, who are assigned to the first group of people, is stored in the local memory. People who regularly enter and exit a building and/or area, in which the time and/or attendance recording device is arranged, are preferably assigned to the first group of people. Such people, whose main place of work is in the building and/or area in which the time and/or attendance recording device is arranged, are therefore preferably assigned to the first group of people.

The first group of people is preferably assigned such people:

who use the building and/or area, in which the time and/or attendance recording device is arranged, in a definable time period more frequently than a selectable threshold value; and/or who use the time and/or attendance recording device in a definable time period more frequently than a selectable threshold value. For persons, who are assigned to the first group of people, storage of personal data in the local memory can be advantageously used to ensure that, in the case of interactions or clocking process of such people at the time and/or attendance recording device, data does not have to be retrieved and/or transmitted to a server system, whereby resources and energy can be saved. Wait times typically associated with the communication with such a server system can also be hereby avoided. It is conceivable that the personal data of the first group of people stored in the local memory is synchronized with the server system, in particular at regular or irregular intervals. It is for example conceivable that, when personal data in the server system relating to one or a plurality of people, who are assigned to the first group of people, is changed, these changes are transmitted to the time and/or attendance recording device, for example at definable times, in selectable time windows or immediately after the change.

According to one configuration of the present disclosure, it is conceivable that personal data for the local site, at which the time and/or attendance recording device is arranged, is retrieved by the time and/or attendance recording device from the server system and stored in the local memory. In particular, the personal data of people, who are assigned to the first group of people, are therefore retrieved by the time and/or attendance recording device from the server system and stored in the local memory.

According to one embodiment of the present disclosure, it is provided that the time and/or attendance recording device, in the case of a user interaction of a first person, who is assigned to the first group of people, with the time and/or attendance recording device, is configured to record time information, wherein the time and/or attendance recording device is configured to store the recorded time information, relating to the user interaction of the first person, in the local memory, preferably as part of the personal data of the first person for recording attendance times and/or working times of the first person. The time information recorded for the user interaction thereby relates in particular to the time of the user interaction. Attendance time and/or working time profiles for people of the first group of people can be hereby stored in the local memory, wherein the attendance times and/or working times of the people of the first group of people are maintained in the local memory. It is conceivable that the attendance times and/or working times of the people of the first group of people maintained in the local memory are transmitted preferably at regular or irregular intervals, from the time and/or attendance recording device to the server system. The attendance times and/or working times of the people of the first group of people can be hereby updated in the central server system at irregular or regular intervals.

According to the disclosure, different technical configurations can be considered for the user interactions that people carry out with the time and/or attendance recording device. It is conceivable that the user interaction of a person with the time and/or attendance recording device comprises receiving and/or reading identification information of this person by way of the time and/or attendance recording device, preferably wherein the receipt and/or reading of the identification information of this person takes place by way of:

an input device of the time and/or attendance recording device; and/or a communication interface of the time and/or attendance recording device; and/or

a sensor of the time and/or attendance recording device. As the sensors, optical sensors are for example considered, wherein the user interaction comprises reading an ID card of a person by way of such a sensor. Alternatively or additionally, the user interaction can for example take place by means of RFID (radio frequency identification) and/or NFC (near-field communication). A person carries corresponding RFID identification information or NFC identification information with them for this purpose and the time and/or attendance recording device reads the RFID identification information or NFC identification information as part of the user interaction.

According to one embodiment of the present disclosure, it is provided that the plurality of groups of people comprises a second group of people, wherein personal data relating to people, who are assigned to the second group of people, is retrieved by the time and/or attendance recording device from the server system, preferably wherein the personal data relating to people, who are assigned to the second group of people, is stored in the server system, particularly preferably wherein the personal data relating to people, who are assigned to the second group of people, is not stored in the local memory. Therefore, it is advantageously conceivable that the personal data of people, who are assigned to the second group of people, is or will not be stored in the local memory of the time and/or attendance recording device. Resources in the local memory or hard disc can be hereby saved. For example, such people, who seldom or never use the building and/or area, to which the time and/or attendance recording device is attached, are assigned to the second group of people.

It is preferably conceivable that both the people assigned to the first group of people and to the second group of people are part of a group of people, who are employed at the same company or at the same group of associated companies. Alternatively or additionally, it is conceivable that both the people assigned to the first group of people and to the second group of people are part of a group of people, who have access permission for the entrance to the buildings and/or areas of a company or a group of associated companies.

According to one embodiment of the present disclosure, it is conceivable that the time and/or attendance recording device is configured in such manner that, in the case of a user interaction of a second person, who is assigned to the second group of people, with the time and/or attendance recording device, the time and/or attendance recording device records time information relating to the user interaction of the second person, wherein the time and/or attendance recording device is configured in such manner that the time and/or attendance recording device:

retrieves personal data of the second person, preferably for recording attendance times and/or working times of the second person; and/or the recorded time information, relating to the user interaction of the second person, is transmitted from the time and/or attendance recording device to the server system, in particular for supplementing and/or changing the personal data relating to the second person stored in the server system. The time information relating to the user interaction of the second person is preferably stored by the server system as part of the personal data relating to the second person and/or the personal data is updated by the server system on the basis of the received time information relating to the user interaction of the second person. For example, it may occur that a second person, who typically does not use the time and/or attendance recording device since they work at another location, but, in exceptional cases, enters the building and/or area to which the time and/or attendance recording device is assigned. In this case, by communicating with the server by way of the time and/or attendance recording device, advantageous maintenance of the attendance times and/or working times of the second person, even in such a situation, can take place or be ensured.

According to one embodiment of the present disclosure, it is provided that the personal data comprises a personal working time profile, in particular for recording attendance times and/or working times for each person. It is conceivable that the time and/or attendance recording device is configured in such manner that the working time profiles of people, who are assigned to the first group of people, are stored in the local memory preferably for recording attendance times and/or working times of the people of the first group of people. It is conceivable that the server system is configured in such manner that the working time profiles of people, who are assigned to the second group of people, are stored in the server system preferably for recording attendance times and/or working times of the people of the second group of people and can preferably be retrieved by the time and/or attendance recording device. In particular, the working time profiles of people of the second group of people are not stored in the local memory of the time and/or attendance recording device such that they can be retrieved by the time and/or attendance recording device as needed, in particular in the case of an interaction of a person of the second group of people with the time and/or attendance recording device.

According to one embodiment of the present disclosure, it is provided that the time and/or attendance recording device is configured in such manner that a person:

depending on a number of user interactions of this person, in particular in a definable timeframe, with the time and/or attendance recording device; and/or depending on a number of user interactions of this person, in particular in a definable timeframe, with one or a plurality of additional time and/or attendance recording devices, which are assigned to the same building and/or area as the time and/or attendance recording device, is, in particular automatically, assigned to another group of people from the plurality of groups of people. A particularly advantageous dynamic assignment of a person to a group of people of the plurality of groups of people can hereby take place, in particular depending on a frequency of use of the time and/or attendance recording device and/or additional time and/or attendance recording devices of the same building and/or area by this person. It is hereby possible to, partially or fully, dispense with a manual assignment of the people to the individual groups of people of the plurality of groups of people. It is conceivable that the assignment of a person to another group of people from the plurality of groups of people is carried out by the time and/or attendance recording device and/or by the server system. According to one embodiment of the present disclosure, it is conceivable that the assignment of people to a group of people from the plurality of groups of people takes place by means of an artificial intelligence and/or by means of machine learning.

According to one embodiment of the present disclosure, the assignment of a person to a group of people from the plurality of groups of people takes place by saving and/or storing an assignment of identification information of the person to a group of people from the plurality of groups of people. The assignment can for example be saved and/or stored in the local memory and/or the server system.

According to one embodiment of the present disclosure, it is conceivable that the time and/or attendance recording device is configured in such manner that the, in particular automatic, assignment of a person to another group of people takes place taking into account the free storage capacity of the local memory. Therefore, it is conceivable that the assignment of a person to another group of people takes place depending on the free storage capacity of the local memory such that the hardware conditions of the time and/or attendance recording device can be advantageously taken into account.

According to one embodiment of the present disclosure, it is conceivable that a dynamic learning process is implemented in such manner that people can be assigned to other groups of people from the plurality of groups of people depending on their underlying history of user interactions with time and/or attendance recording devices in order to change the storage behavior or the storage location of their personal data and to adapt it to the history of their interactions. For example, it is conceivable that for the case where a certain person has carried out a definable number of interactions or clocking processes in a definable time period with a time and/or attendance recording device or a plurality of time and/or attendance recording devices at the same location, a decision is automatically taken to store the personal data locally in this time and/or attendance recording device or these time and/or attendance recording devices. A dynamic process is hereby possible, which allows a high degree of efficiency with a limited number of user profiles and therefore with limited storage space in the local memories of time and/or attendance recording devices. It is thereby advantageously conceivable that the personal data of people, who have no longer reached a definable number of interactions with a time and/or attendance recording device or a plurality of time and/or attendance recording devices at the same location in a definable time period, are actively sorted out of the location memories of this time and/or attendance recording device or time and/or attendance recording devices. For example, the data of people, who were not at a location for several weeks, can hereby be deleted from the local memories.

According to one embodiment of the present disclosure, it is provided that the time and/or attendance recording device is configured in such manner that:

when the assignment of a person is changed from the first group of people to the second group of people, the personal data present in the local memory relating to this person is partially or fully removed from the local memory; and/or when the assignment of a person is changed from the second group of people to the first group of people, personal data relating to this person is received by the time and/or attendance recording device from the server system, wherein the received personal data is stored in the local memory. An advantageous automated storage space management can be hereby set up for the local memory of the time and/or attendance recording device.

According to one embodiment of the present disclosure, it is provided that for a person, preferably through the server system and/or via an interaction with an input device of the time and/or attendance recording device;

an assignment of this person to a group of people from the plurality of groups of people, in particular at least to the first group of people or to the second group of people, can be defined and/or changed;

and/or a setting can be defined, which prevents an automatic assignment of this person to another group of people of the plurality of groups of people. An assignment can be hereby manually defined or a label set for people, which prevents the assignment of this person to a group of people being changed automatically. This can for example be particularly advantageous in the case of "flying" employees of a company, who use a determined building and/or area for a period of time of several days which they will later no longer use or only very seldom use. For example, it can therefore be manually prevented that the personal data of such a person is automatically downloaded on one or a plurality of time and/or attendance recording devices of this building and/or area due to their repeated use of a determined building and/or area.

Another subject matter of the present disclosure is a system having a time and/or attendance recording device according to one embodiment of the present disclosure, wherein the time and/or attendance recording device is in particular arranged on or in a building and/or area.

According to one embodiment of the present disclosure, it is provided that the system also comprises the server system, wherein the server system is configured in particular for communicating with the time and/or attendance recording device via the communication interface of the time and/or attendance recording device. The communication between the time and/or attendance recording device can take place in a wired and/or wireless manner. According to one embodiment of the present disclosure, it is conceivable that the server system is designed by means of one or a plurality of computers. The one or the plurality of computers of the server system can be arranged at the same location or at different locations.

According to one embodiment of the present disclosure, in particular of the system according to the disclosure, it is provided that another time and/or attendance recording device is arranged on or in another building and/or another area, wherein the other time and/or attendance recording device has a communication interface for communicating with the server system, wherein personal data relating to people of another first group of people is stored in another local memory of the other time and/or attendance recording device, wherein the first group of people and the other first group of people comprise at least in part different people. The other building and/or other area, in which the other time and/or attendance recording device is arranged, is located in particular at a location other than the building and/or area, in which the time and/or attendance recording device is arranged. The other building and/or area is therefore typically used by different people compared to the building and/or area. The local memory of time and/or attendance recording devices of a company or a group of companies can therefore be equipped with personal data of different people depending on the location. In this way, an advantageous time recording can also be implemented in a location-wide manner, wherein in each case effective use of local memories of the time and/or attendance recording devices takes place.

According to one embodiment of the present disclosure, it is preferably conceivable to implement a company-wide system, which has personal data of the employees centrally in a server system, wherein time and/or attendance recording devices, in particular terminals, receive or retrieve step-by-step the personal data for the local site, where they are arranged, from the server system and store it locally in a local memory. It is thereby conceivable that the personal data, which is obtained from the time and/or attendance recording devices, also continues to remain stored in the server system. Alternatively, it is conceivable that people, who are working locally at the location, are assigned to a group of people from the plurality of groups of people in such manner that their personal data is stored exclusively locally in the time and/or attendance recording devices and is preferably no longer stored in the server system. The personal data of other people, for example flying employees, is stored in the server system such that the time and/or attendance recording devices can query or retrieve said data from the server system.

Another subject matter of the present disclosure is a method for using or operating a time and/or attendance recording device according to an embodiment of the present disclosure or a system according to an embodiment of the present disclosure, wherein personal data is stored in the local memory depending on to which group of people from a plurality of groups of people a person is assigned. The method according to the disclosure of a time and/or attendance recording device preferably comprises the use of the time and/or attendance recording device for time and/or attendance recording of people.

According to one embodiment of the present disclosure, in particular of the method according to the disclosure, it is provided that personal data relating to people, who are assigned to the first group of people, is stored in the local memory.

The method according to the disclosure is in particular a computer-implemented method, in which one, a plurality of, or all steps of the method are carried out by computer.

According to one embodiment of the present disclosure, in particular of the method according to the disclosure, it is provided that the time and/or attendance recording device records time information in the case of a user interaction of a first person, who is assigned to the first group of people, with the time and/or attendance recording device, wherein the time and/or attendance recording device stores the recorded time information in the local memory, preferably as part of the personal data relating to the first person, particularly preferably for recording attendance times and/or working times of the first person.

According to one embodiment of the present disclosure, in particular of the method according to the disclosure, it is conceivable that the time and/or attendance recording device records time information relating to the user interaction of a second person, in the case of a user interaction of the second person of a second group of people with the time and/or attendance recording device, wherein the time and/or attendance recording device:

retrieves personal data relating to the second person, particularly preferably for recording attendance times and/or working times of the second person from the server system; and/or the recorded time information, relating to the user interaction of the second person, is transmitted to the server system, in particular for supplementing and/or changing the personal data relating to the second person stored in the server system. This enables handling of personal data that is advantageously adapted to the attendance frequency of a person.

Another subject matter of the present disclosure is a computer program product, comprising commands, which, when executed by computer means, in particular by a time and/or attendance recording device according to an embodiment of the present disclosure and/or by a system according to an embodiment of the present disclosure, causes the time and/or attendance recording device to carry out a method according to an embodiment of the present disclosure.

The features, embodiments and advantages, which have been described in connection with one of the subject matters according to the disclosure, can each also be applied to the other subject matters according to the disclosure. In particular, for the system according to the disclosure, the method according to the disclosure and the computer program product according to the disclosure, the features, embodiments and advantages can thereby be applied, which have already been described in connection with the time and/or attendance recording device according to the disclosure or in connection with an embodiment of the time and/or attendance recording device according to the disclosure. Accordingly, for the time and/or attendance recording device according to the disclosure, the method according to the disclosure and the computer program product according to the disclosure, the features, embodiments and advantages can be applied, which have already been described in connection with the system according to the disclosure or in connection with an embodiment of the system according to the disclosure.

BRIEF DESCRIPTION OF THE DRAWINGS

Further advantages and details of the disclosure will be explained below on the basis of the exemplary embodiments illustrated in the drawings, in which is shown FIG. 1 a schematic illustration of a system according to an exemplary embodiment of the present disclosure.

DETAILED DESCRIPTION OF THE DRAWINGS

Figure 1:
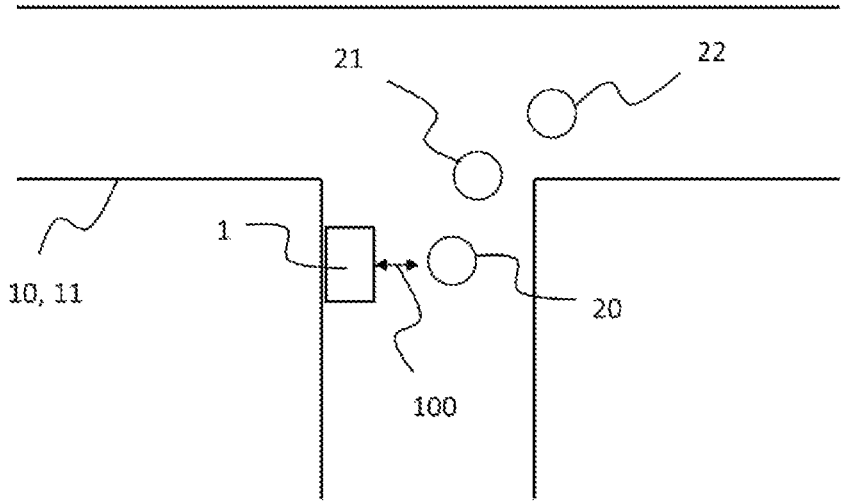

In the different figures, identical parts are always provided with the identical reference numerals and are therefore generally also each named and mentioned only once.

The present disclosure will be described in relation to determined embodiments and with reference to determined drawings, but the disclosure is not limited thereto, but only by the claims. The described drawings are only schematic and not limiting. In the drawings, the size of some elements may be exaggerated and not shown to scale for illustration purposes.

If an indefinite or a definite article is used and/or if reference is made to a single noun, e.g. "a", "one", "the", this includes a plural of this noun, unless otherwise explicitly indicated.

Furthermore, the terms "first", "second", "third" and the like in the description and in the claims are used to distinguish between similar elements and are not limited to the description of a sequential or chronological order. It is understood that the terms used in this manner can be interchanged in appropriate circumstances and that the embodiments of the disclosure described herein can function in a different sequence to the one described or illustrated herein.

A system according to an exemplary embodiment of the present disclosure is shown in FIG. 1. A time and/or attendance recording device 1 for time and/or attendance recording of people 20, 21, 22 is arranged in a building 10 or area 11. The time and/or attendance recording device 1 is typically located in an entrance region or near the entrance of the building such that the people 20, 21, 22 can interact with the time and/or attendance recording device 1 when entering or exiting the building 10 or area 11. The building 10 or area 11 can for example be a hospital or a commercial operation or another company. A user interaction 100 of a person 20 with the time and/or attendance recording device 1 is illustrated by way of example with an arrow. The user interactions can for example be identified via a sensor of the time and/or attendance recording device 1 and typically comprise the recognition or reading of identification information of the person 20 in order to maintain the attendance times or working times of the person 20. It is conceivable that the person 20 can access their personal data via the time and/or attendance recording device 1 and can input and request holidays for example, or view or change their personal master data. It is also conceivable that via the time and/or attendance recording device 1 a person 20, 21, 22 can communicate with a human resources department of the company to which the time and/or attendance recording device 1 is assigned.

Figure 2:
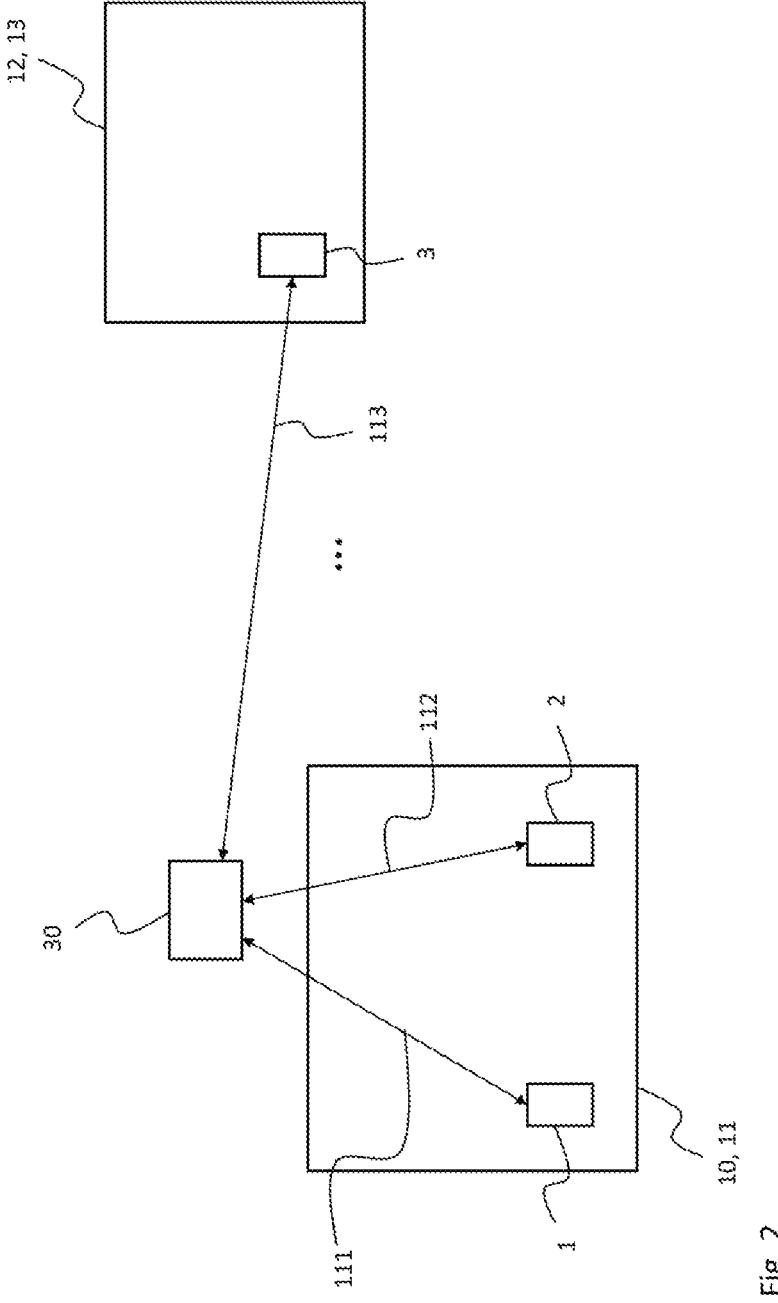
FIG. 2 a schematic illustration of a system according to an exemplary embodiment of the present disclosure.

A system according to an exemplary embodiment of the present disclosure is shown in FIG. 2. A time and/or attendance recording device 1 is arranged in a building 10 or area 11. Furthermore, an additional time and/or attendance recording device 2 is arranged in the building 10 or area 11 and can be designed for example to be identical in design to the time and/or attendance recording device 1. The time and/or attendance recording device 1 has a communication interface via which a communication connection 111 can be established with a server system 30. The additional time and/or attendance recording device 2 also has a communication interface via which a communication connection 112 can be established with a server system 30. The server system 30 can be arranged within or outside of the building 10 or area 11. It is conceivable that the server system 30 comprises one or a plurality of servers, which are arranged at different locations or sites.

Furthermore, another building 12 or another area 13 is illustrated in which another time and/or attendance recording device 3 is arranged. The other time and/or attendance recording device 3 is in particular assigned to the same company or the same group of companies as the time and/or attendance recording device 1. The other time and/or attendance recording device 3 also has a communication interface via which a communication connection 113 can be established with a server system 30.

The communication connections 111, 112, 113 can each be designed in a wireless and/or wired manner. The communication connections 111, 112, 113 can in particular be designed by means of an internal company network.

Figure 3:
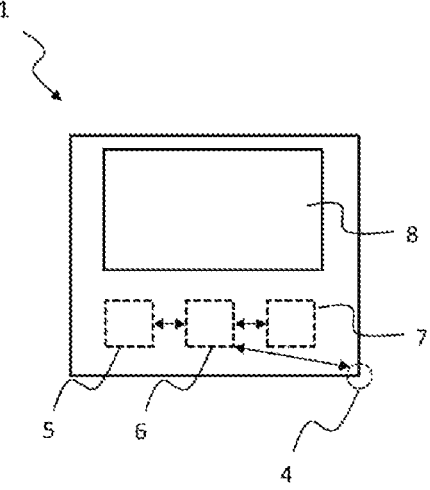
FIG. 3 a schematic illustration of a time and/or attendance recording device according to an exemplary embodiment of the present disclosure.

A time and/or attendance recording device 1 according to an exemplary embodiment of the present disclosure is shown schematically in FIG. 3. The time and/or attendance recording device 1 is intended for time and/or attendance recording of people. The time and/or attendance recording device 1 has a local memory 5 and a communication interface 4 for communicating with a server system 30 via a communication connection 111. Personal data can be stored in the local memory 5.

Furthermore, the time and/or attendance recording device 1 comprises an internal control device 6, in particular computer means and a sensor 7 for detecting user interactions, which users carry out at the time and/or attendance recording device 1. Moreover, the time and/or attendance recording device 1 comprises a screen 8 on which information, for example personal data, can be displayed. The screen 8 can be designed simultaneously in the form of a touchscreen and input device. Alternatively or additionally, it is conceivable that the time and/or attendance recording device 1 has an input device separate from the screen, for example a keypad or buttons. Alternatively or additionally, the time and/or attendance recording device 1 can have for example a signal lamp. Alternatively or additionally, the time and/or attendance recording device 1 can have for example an acoustic playback device and/or an acoustic input device.

A method according to the disclosure can be implemented by means of the exemplary embodiments illustrated in FIGS. 1 to 3.

Figure 4:
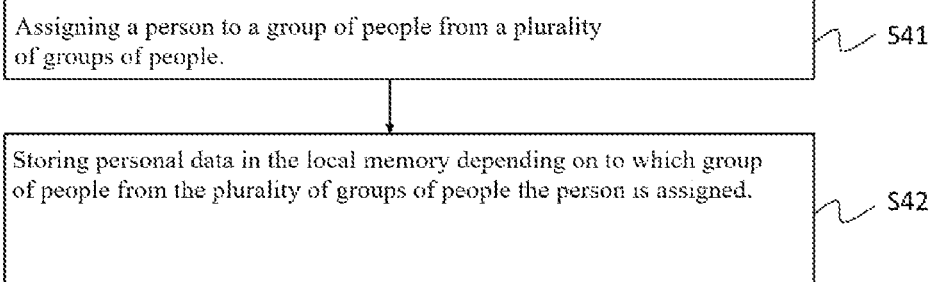
FIGS. 4 to 9 schematic illustrations of methods in each case according to exemplary embodiments of the present disclosure.

An illustration of an exemplary embodiment of the present disclosure is shown schematically in FIG. 4. A person is assigned to a group of people from a plurality of groups of people in a step S41. The plurality of groups of people comprises in particular at least one first group of people and a second group of people. It is conceivable that the plurality of groups of people comprises further groups of people, in addition to the first and second group of people. Personal data is stored in the local memory 5 in a step S42 depending on to which group of people from the plurality of groups of people the person is assigned.

Figure 5:
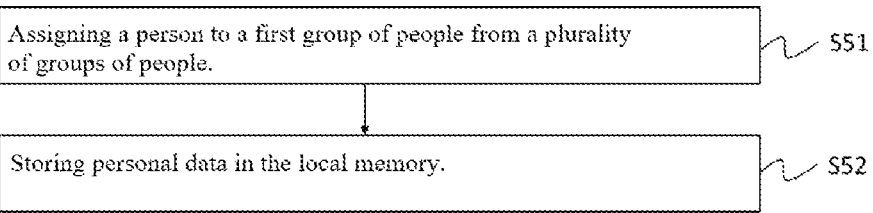

An illustration of an exemplary embodiment of the present disclosure is shown schematically in FIG. 5. A person is assigned to a first group of people from a plurality of groups of people in a step S51. Personal data is stored in the local memory 5 in a step S52, in particular in the local memory 5 of the time and/or attendance recording device 1. Personal data is thereby stored in the local memory 5 in step S51 as a result of the assignment of the person to the first group of people. In particular, personal data for all people, who are assigned to the first group of people, is stored in the local memory 5. The first group of people comprises in particular such people, who are regularly present at the location, at which the time and/or attendance recording device 1 is arranged.

Figure 6:
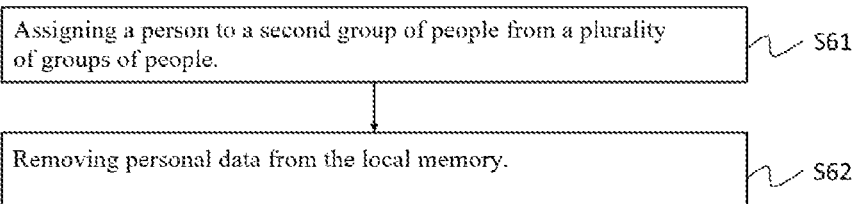

An illustration of an exemplary embodiment of the present disclosure is shown schematically in FIG. 6. A person is assigned to a second group of people from a plurality of groups of people in a step S61. Personal data is removed from the local memory 5 in a step S62, in particular from the local memory 5 of the time and/or attendance recording device 1. Personal data is thereby removed from the local memory 5 in step S61 as a result of the assignment of the person to the second group of people. In particular, personal data for all people, who are assigned to the second group of people, is not stored in the local memory 5 and/or removed from the local memory 5 as a result of the assignment to the second group of people. The second group of people comprises in particular such people, who are seldom or never present at the location, at which the time and/or attendance recording device 1 is arranged.

Figure 7:
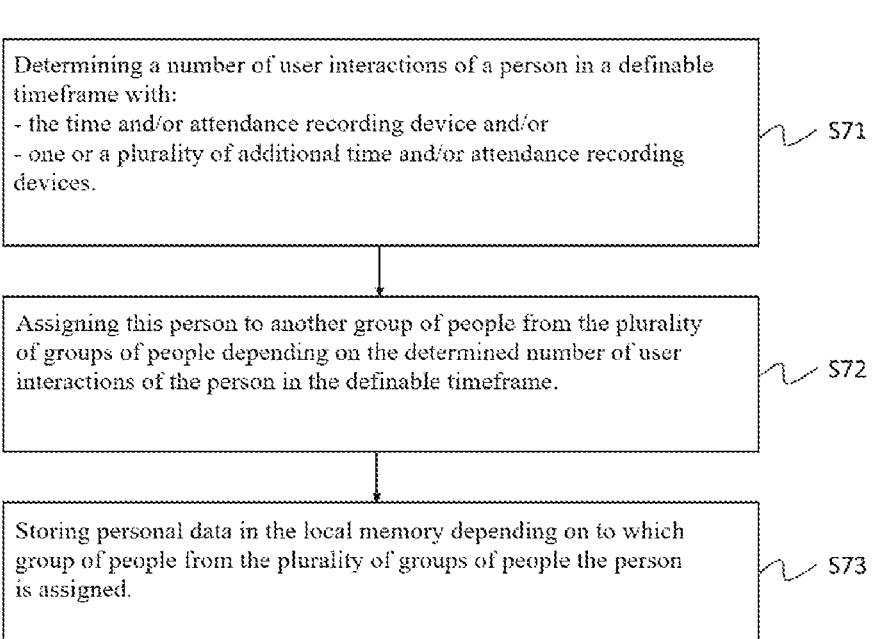

An illustration of an exemplary embodiment of the present disclosure is shown schematically in FIG. 7. In a step S71, a number of user interactions of a person in a definable timeframe is determined with:

the time and/or attendance recording device 1 and/or one or a plurality of additional time and/or attendance recording devices 2. The one or plurality of additional time and/or attendance recording devices 2 are thereby in particular arranged at the same building 10 or area 11 as the time and/or attendance recording device 1. This person is assigned to another group of people from the plurality of groups of people in a step S72 depending on the determined number of user interactions of the person in the definable timeframe. Personal data is stored in the local memory in a step S73 depending on to which group of people from the plurality of groups of people the person is assigned. By changing the assignment of a person to a determined group of people in this way on the basis of the usage history of time and/or attendance recording devices 1, 2 by this person, a dynamic storage management can take place, wherein the system can be adapted to changes of the behavior or of the attendance pattern of people.

Figure 8:
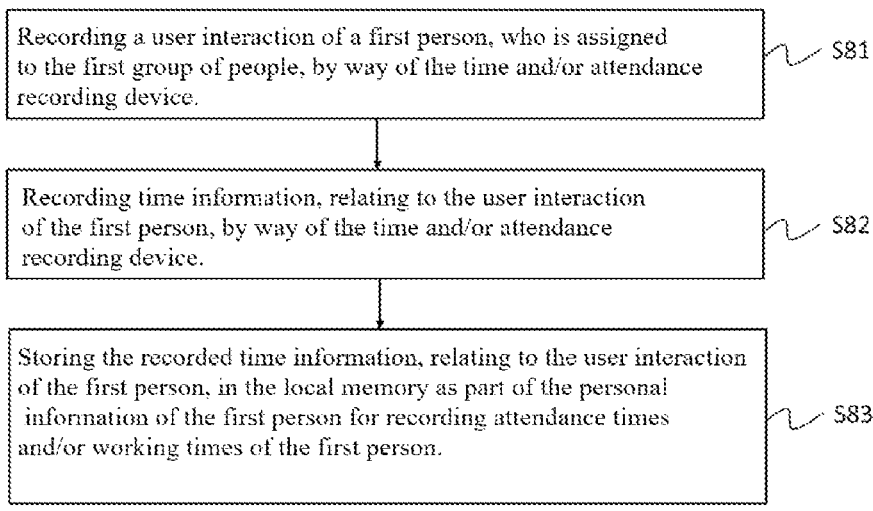

An illustration of an exemplary embodiment of the present disclosure is shown schematically in FIG. 8. A user interaction of a first person, who is assigned to the first group of people, is recorded by the time and/or attendance recording device 1 in a step S81. Time information relating to the user interaction of the first person is recorded by the time and/or attendance recording device 1 in a step S82. The recorded time information relating to the user interaction of the first person is stored in the local memory 5 in a step S83 as part of the personal data of the first person for recording attendance times and/or working times of the first person. For such a person, who is assigned to the first group of people, in the case of a clocking process or user interaction for recording the working time or attendance, communication with the server system 30 can therefore be advantageously dispensed with, which for example reduces the network utilization and latency. Wait times at the time and/or attendance recording device 1 can be hereby minimized and energy saved.

Figure 9:
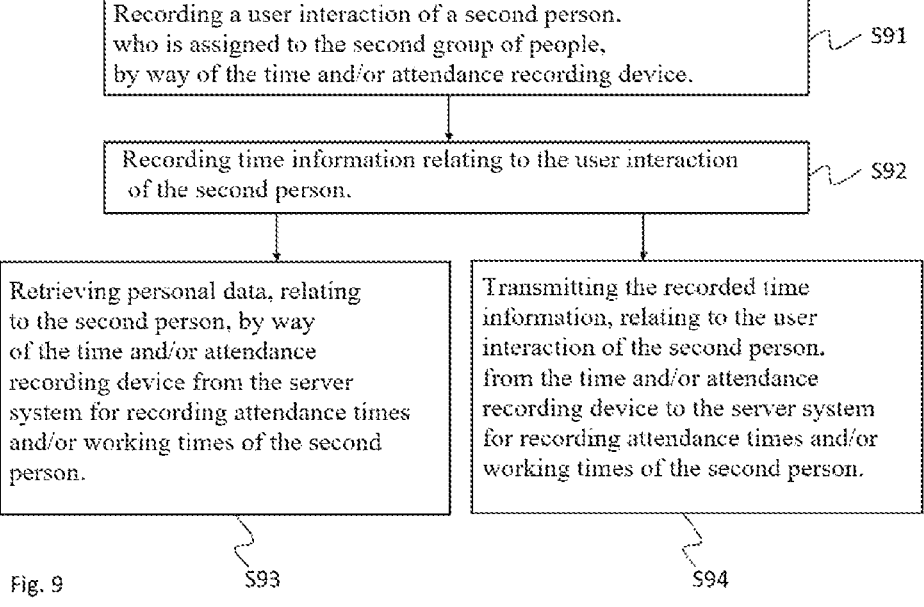

An illustration of an exemplary embodiment of the present disclosure is shown schematically in FIG. 9. A user interaction of a second person, who is assigned to the second group of people, is recorded by the time and/or attendance recording device 1 in a step 91. Time information relating to the user interaction of the second person is recorded in a step S92. A step S93 is carried out before, during and/or after step S92. Alternatively or additionally to step S93, a step S94 is carried out after step S92. Personal data relating to the second person is retrieved by the time and/or attendance recording device 1 from the server system for recording attendance times and/or working times of the second person in step S93. The recorded time information relating to the user interaction of the second person is transmitted from the time and/or attendance recording device 1 to the server system 30 for recording attendance times and/or working times of the second person in step S94. The second person is a person who is assigned to the second group of people, i.e. preferably a person who is never or seldom present at the location of the time and/or attendance recording device 1. The personal data of this second person is therefore not stored in the local memory 5. Instead, communication takes place with the server system 30 to record attendance times and/or working times for this second person.

Features of the exemplary embodiments illustrated in FIGS. 4 to 9 can be combined with one another.

The invention claimed is:

1. A time and/or attendance recording device for time and attendance recording of people, comprising: a local memory or the device is connected to a local memory, wherein the time and/or attendance recording device has a communication interface for communicating with a server system, wherein personal data is configured to be stored in the local memory, and the time and/or attendance recording device includes a screen configured to display said personal data and an input device separate from the screen, and data is transmitted between the time and/or attendance recording device and the server system, wherein the time and/or attendance recording device is configured such that personal data is stored in the local memory depending on to which group of people from a plurality of groups of people a person is assigned, wherein the time and/or attendance recording device is configured such that a person:

depending on a number of user interactions of this person, in a definable timeframe, with the time and/or attendance recording device; and/or depending on a number of user interactions of this person, in a definable timeframe, with one or a plurality of additional time and/or attendance recording devices, which are assigned to the same building and/or area as the time and/or attendance recording device, is, assigned to another group of people from the plurality of groups of people.

2. A time and/or attendance recording device for time and attendance recording of people, comprising: a local memory or the device is connected to a local memory, wherein the time and/or attendance recording device has a communication interface for communicating with a server system, a screen configured to display said personal data, and an input device separate from the screen, whereby data is transmitted between the time and/or attendance recording device and the server system, wherein personal data is configured to be stored in the local memory wherein the time and/or attendance recording device is configured such that personal data is stored in the local memory depending on to which group of people from a plurality of groups of people a person is assigned, wherein the time and/or attendance recording device is configured such that a person is, assigned to another group of people taking into account the free storage capacity of the local memory.

3. A time and/or attendance recording device for time and attendance recording of people, comprising: a local memory or the device is connected to a local memory, wherein the time and/or attendance recording device has a communication interface for communicating with a server system and a screen configured to display said personal data, and an input device separate from the screen, whereby data is transmitted between the time and/or attendance recording device and the server system, wherein personal data is configured to be stored in the local memory, wherein the time and/or attendance recording device is configured such that personal data is stored in the local memory depending on to which group of people from a plurality of groups of people a person is assigned, wherein the time and/or attendance recording device is configured such that:

when the assignment of a person is changed from the first group of people to the second group of people, personal data present in the local memory relating to this person is partially or fully removed from the local memory; and/or when the assignment of a person is changed from the second group of people to the first group of people, personal data relating to this person is received by the time and/or attendance recording device from the server system, wherein the received personal data is stored in the local memory.

4. The time and/or attendance recording device according to claim 1, wherein the plurality of groups of people comprises at least one first group of people, wherein personal data relating to people, which are assigned to the first group of people, is stored in the local memory.

5. The time and/or attendance recording device according to claim 4, wherein, in the case of a user interaction of a first person, who is assigned to the first group of people, with the time and/or attendance recording device, the time and/or attendance recording device is configured to record time information, wherein the time and/or attendance recording device is configured to store the recorded time information, relating to the user interaction of the first person, in the local memory, as part of personal data of the first person for recording attendance times and/or working times of the first person.

6. The time and/or attendance recording device according to claim 4, wherein the plurality of groups of people comprises a second group of people, wherein personal data relating to people, who are assigned to the second group of people, is retrievable by the time and/or attendance recording device from the server system, wherein personal data relating to people, who are assigned to the second group of people, is stored in the server system, wherein personal data relating to people, who are assigned to the second group of people, is not stored in the local memory.

7. The time and/or attendance recording device according to claim 1, wherein personal data comprises a personal working time profile for recording attendance times and/or working times for each person.

8. The time and/or attendance recording device according to claim 6, wherein, for a person, using the server system and/or via an interaction with the input device of the time and/or attendance recording device:

an assignment of this person to a group of people from the plurality of groups of people, at least to the first group of people or to the second group of people, is configured to be defined and/or changed;

and/or a setting is configured to be defined, which prevents an automatic assignment of this person to another group of people of the plurality of groups of people.

9. A system having the time and/or attendance recording device according to claim 1, wherein the time and/or attendance recording device is arranged on or in a building and/or area.

10. The system according to claim 9, wherein the system also comprises the server system, wherein the server system is configured for communicating with the time and/or attendance recording device via the communication interface of the time and/or attendance recording device.

11. The system according to claim 9, wherein another time and/or attendance recording device is arranged on or in another building and/or another area, wherein the other time and/or attendance recording device has a communication interface for communicating with the server system, wherein personal data relating to people of another first group of people is stored in another local memory of the other time and/or attendance recording device, wherein the first group of people and the other first group of people comprise at least in part different people.

12. A method for operating a time and/or attendance recording device according to claim 1 or operating a system having the time and/or attendance recording device, wherein the time and/or attendance recording device is arranged on or in a building and/or area, wherein personal data is stored in the local memory depending on to which group of people from a plurality of groups of people a person is assigned.

13. The method according to claim 12, wherein the time and/or attendance recording device records time information in the case of a user interaction of a first person, who is assigned to the first group of people, with the time and/or attendance recording device, wherein the time and/or attendance recording device stores the recorded time information in the local memory, as part of personal data relating to the first person, configured for recording attendance times and/or working times of the first person.

14. A non-transitory computer program product, the computer program product comprising commands, which, when executed by computer means, by a time and/or attendance recording device according to claim 1 and/or by a system having the time and/or attendance recording device according to claim 1, wherein the time and/or attendance recording device is arranged on or in a building and/or area, causes this time and/or attendance recording device to carry out a method for operating the time and/or attendance recording device or a system having the time and/or attendance recording device, wherein the time and/or attendance recording device is arranged on or in a building and/or area, wherein personal data is stored in the local memory depending on to which group of people from a plurality of groups of people a person is assigned.

* * * * *